May 3, 1927.
E. V. OLIVER
WATER STILL
Filed Dec. 4, 1923
1,626,960
4 Sheets-Sheet 2
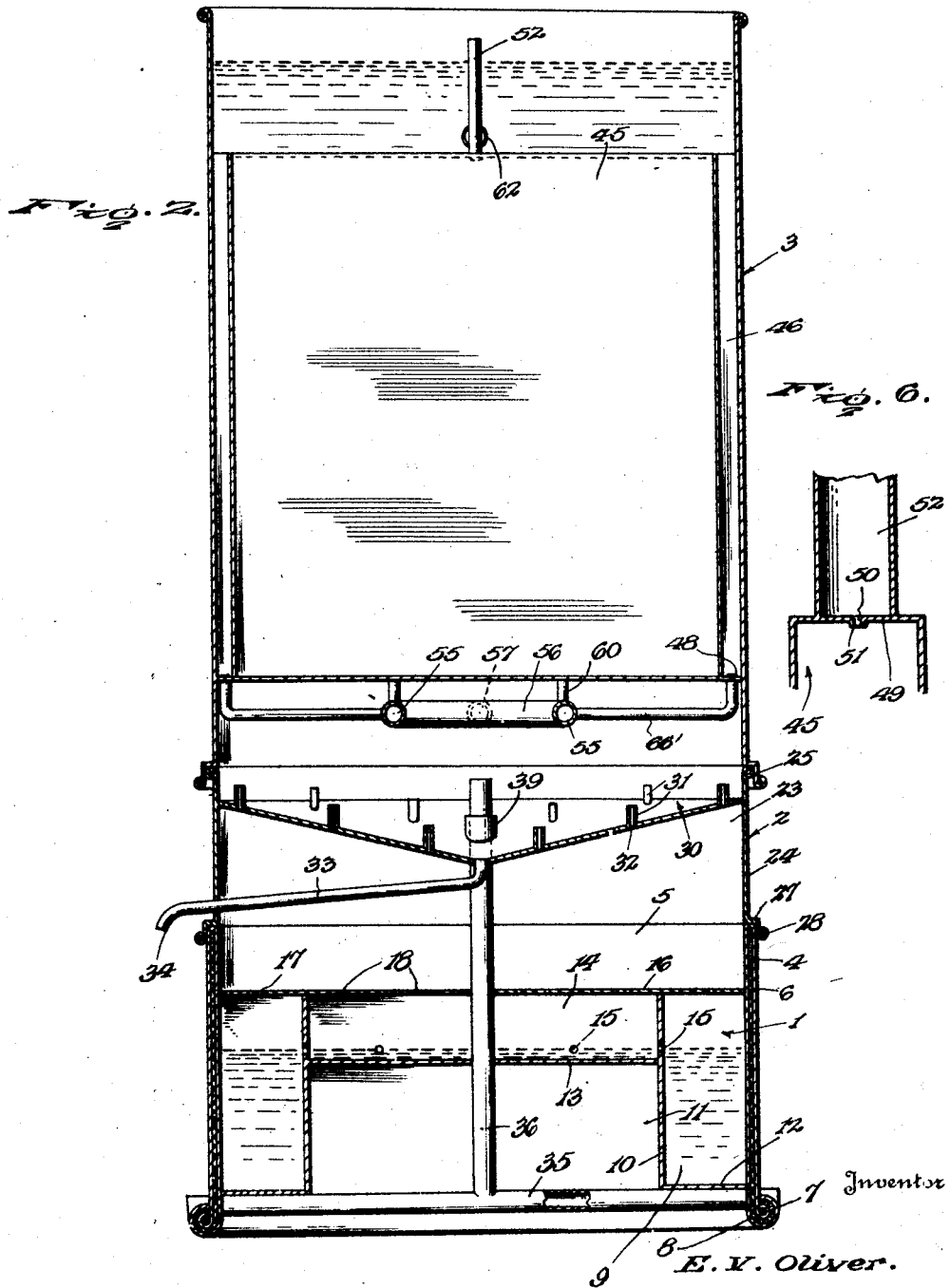

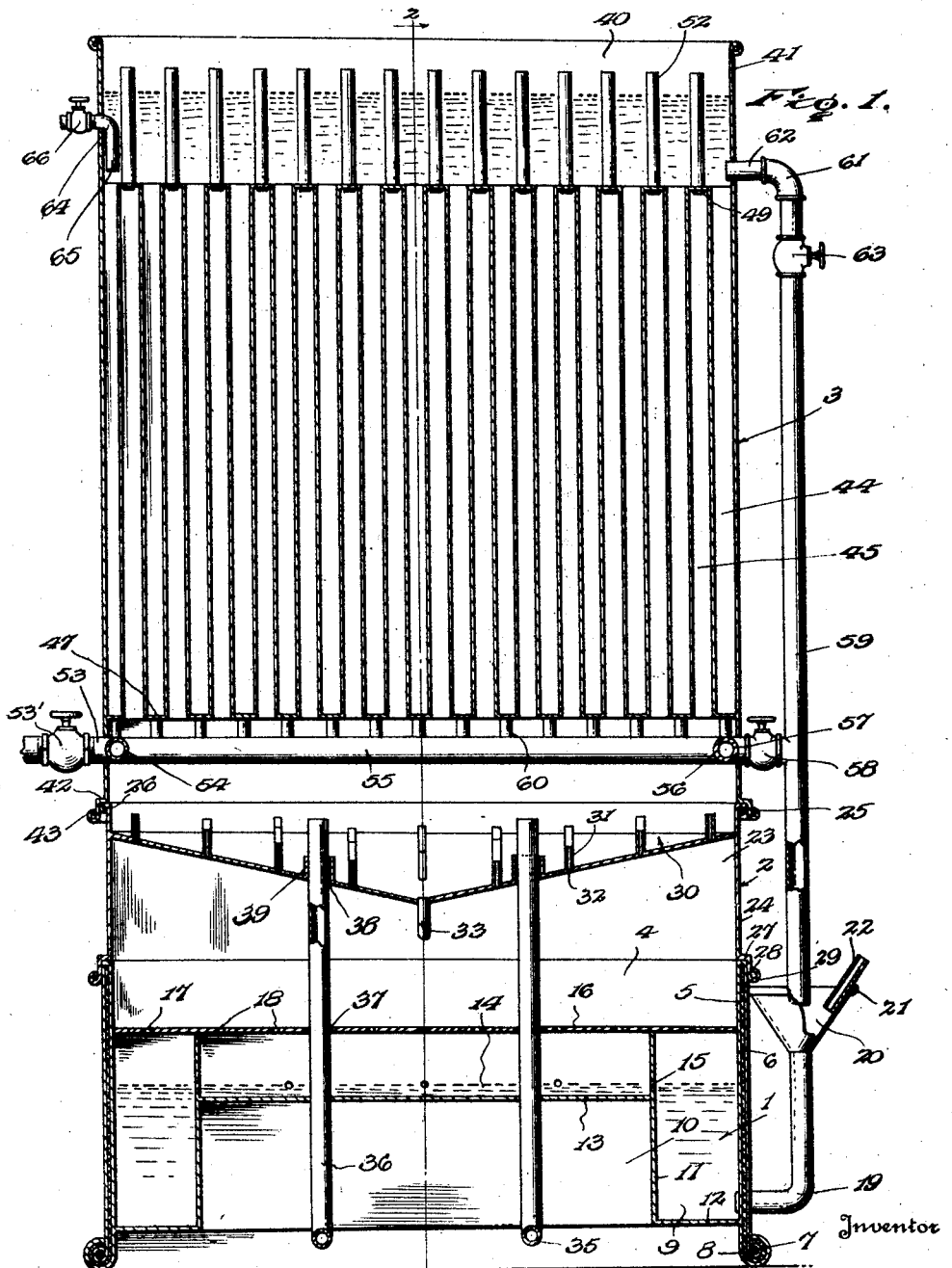

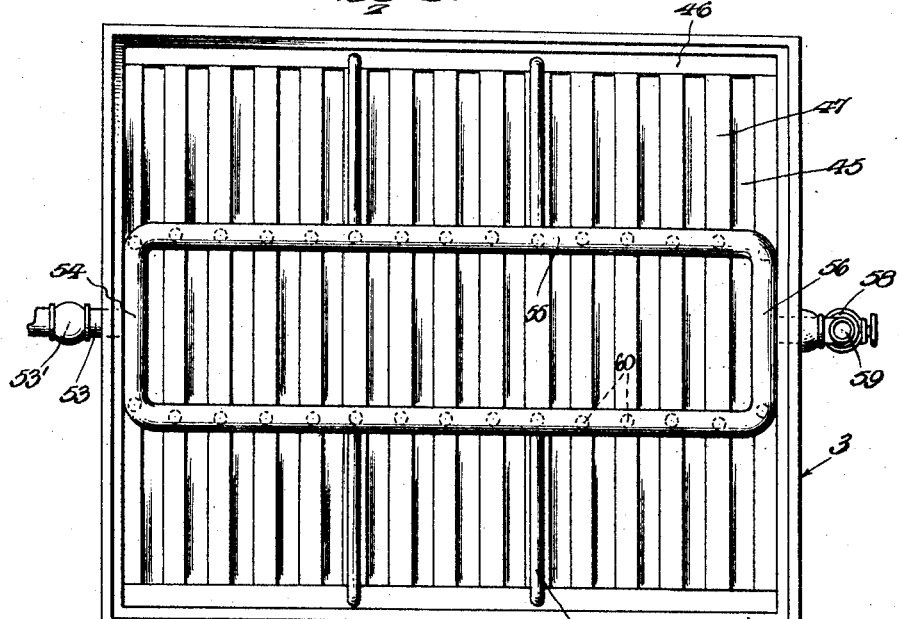
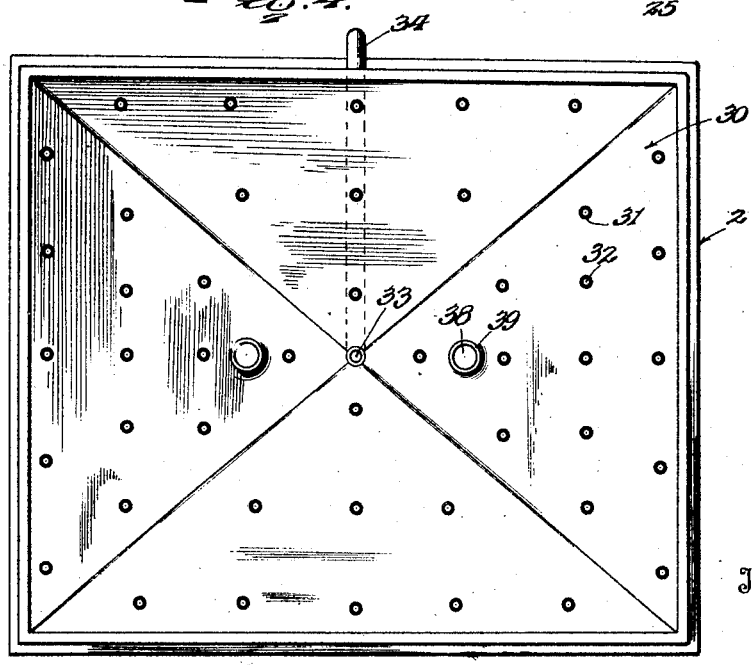

May 3, 1927.

E. V. OLIVER

WATER STILL

Filed Dec. 4, 1923 4 Sheets-Sheet 4

1,626,960

Inventor
E. V. Oliver.
By Larry Lacey, Attorneys

Patented May 3, 1927.

1,626,960

UNITED STATES PATENT OFFICE.

ERNON V. OLIVER, OF PORTLAND, OREGON.

WATER STILL.

Application filed December 4, 1923. Serial No. 678,451.

This invention relates to improvements in water stills and has as its general object to provide a water still for domestic use which may be operated at a minimum cost and which will embody features rendering it of maximum efficiency.

One of the more specific objects of the invention is to so construct the still that there will be effected an economy in the consumption of the fuel necessary to carry out the distilling operation, advantage being taken of all factors which would lead to this result.

Another object of the invention is to provide a still so constructed that the steam to be condensed will be generated from an extremely shallow body of water, thereby not only providing for economy in the fuel required to convert the water into steam, but also providing for more rapid vaporization of the water.

Another object of the invention is to so construct the generator unit of the still that the water to be vaporized will be preheated in an economical manner thereby effecting a further economy in the consumption of fuel.

Another object of the invention is to provide a still so constructed that in its operation the distilled water, will be aerated, means being provided for introducing air into the steam or water vapor substantially at the moment of condensation, so that the distilled product will not be "flat" as is usually the case with distilled water, but will on the other hand contain substantially the same volume of absorbed air as does ordinary water from natural sources.

Briefly described, the still embodying the invention comprises a generator, a receiver for the distilled water, and means for condensing the water vapor, and the invention contemplates providing means whereby water which is employed as a cooling medium in the condenser may, as it has its temperature elevated through the exchange of heat units, be delivered to the generator in a more or less preheated state.

Another object of the invention is to provide a novel construction of condenser which will present a maximum surface area to the cooling medium and to the vapors to be condensed and which will, at the same time, be compact thereby especially adapting the still for home use.

Another object of the invention is to provide a novel receiver for the condensed vapors adapted to collect the distilled water in the most effective manner and deliver the same continuously from the apparatus.

Another object of the invention is to provide a distilling apparatus, which, while primarily intended for domestic use in distilling water, may, when desired, and by a slight rearrangement of parts, be employed as a steam cooker.

In the accompanying drawings:

Figure 1 is a vertical sectional view through a distilling apparatus constructed in accordance with the present invention;

Figure 2 is a vertical sectional view taken substantially on the line 2—2 of Figure 1 looking in the direction indicated by the arrows;

Figure 3 is a bottom plan view of the condenser of the apparatus;

Figure 4 is a top plan view of the receiver of the apparatus;

Figure 6 is a detail sectional view through the upper portion of one of the steam chambers of the condenser;

Figure 5:
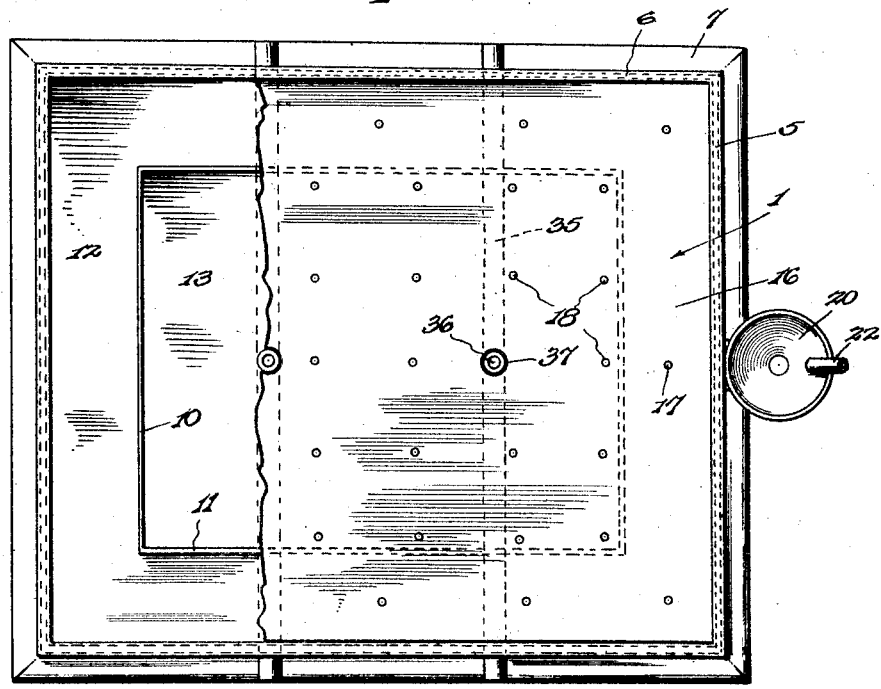
Figure 5 is a top plan view of the generator of the apparatus.

Considering the apparatus solely as a water still, the same consists essentially of a generator which is indicated in general by the numeral 1, a receiver which is indicated in general by the numeral 2, and a condenser which in indicated in general by the numeral 3.

The generator 1 comprises a hollow rectangular body including side walls 4 and end walls 5, and the said walls 4 and 5 are preferably of hollow construction and have their interior spaces filled with asbestos or other heat insulating material as indicated by the numeral 6 so as to conserve the heat units. Preferably the lower edge portions of the walls 4 and 5 are overturned to provide a bead 7, and a reinforcing wire or rod 8 may be enclosed within the rolled bead thereby rendering the structure rigid and substantial. Located within the body of the generator is a preheating chamber 9 comprising side walls 10 and end walls 11 and a bottom 12, the side walls 10 and end walls 11 being located in spaced parallelism with relation to the side and end walls 4 and 5 respectively. It will be evident at this point that the preheating chamber has the form of a hollow rectangle. The walls 10 and 11 of the preheating chamber preferably terminate short of the plane occupied by the upper edges of the walls 4 and 5 of the body of the generator, and supported by these walls within the space surrounded by the said walls 10 and 11, is a plate 13 which constitutes the bottom of a generating chamber 14, the upper portions of the walls 10 and 11 constituting the surrounding or encompassing walls of the said chamber 14. Openings 15 are provided in the said upper portions of the walls 10 and 11 and establish communication between the preheating chamber 9 and the generating chamber 14. These openings 15 are located but a short distance above the plane of the bottom 13 of the generating chamber and it will be evident that by maintaining a water level within the preheating chamber 9 not higher than the openings 15, a pool or very shallow body of water will be maintained in the said generating chamber 14. The generator as a whole is, of course, to be disposed above a stove or other source of heat and due to the very shallow depth of the volume of water which is within the generating chamber, the water will be practically flashed into steam thereby effecting economy in the use of fuel and greatly facilitating the vaporization of the water. It will also be evident at this point that the water in the preheating chamber 9 will be heated due to the proximity of this chamber to the stove or other source of heat, so that as the water is supplied to the generating chamber 14 through the openings 15, it will reach the said generating chamber at a more or less elevated temperature.

In order to further conserve the heat units and, to an extent, prevent the hot air currents passing into the upper portion of the apparatus, and on the other hand confine them to the generating chamber 14, a plate 16 is disposed within the generator body and is supported upon the upper edges of the walls 10 and 11 in a horizontal plane below the plane occupied by the upper edges of the walls 4 and 5. A relatively small number of perforations 17 are formed in the plate 16 in that portion which overlies or covers the top of the preheating chamber 9, and a considerably greater number of perforations 18 are formed in that portion of the plate 16 which overlies and covers the top of the generating chamber 14. The openings 17 are only sufficient in number to relieve any pressure of steam which might tend to lift the plate from its proper position, whereas the openings 18 are sufficient in number to permit free escape of steam from the generating chamber 14, it being understood, however, that the portion of the plate which extends over the top of the generating chamber, constitutes a means for confining the heat to the chamber where it will serve its purpose in vaporizing the water.

In order that water may be supplied to the preheating chamber 9 from a source which will presently be more fully described, a pipe 19 is secured at one end through one of the end walls 5 of the body of the generator unit and extends upwardly beside the said wall and terminates at its upper end in a receiving funnel indicated by the numeral 20, the funnel preferably having its rim overturned, as at 21, so as to be suitably reinforced. The funnel has its open upper side located in a plane a short distance above the plane occupied by the plate 16 and below the plane occupied by the upper edges of the walls 4 and 5 of the generator body. For a purpose to be presently pointed out, a short length of pipe or tubing 22 is soldered or otherwise secured to the inner side of the wall of the funnel and projects at its upper end above the top of the funnel to provide for the connection of a hose or tube (not shown) leading from a source of water supply.

As will be evident by reference to the drawings and particularly Figures 1 and 2 thereof, the receiver is located upon and supported by the generator, and the condenser is in turn located upon and supported by the receiver. The receiver 2 comprises a hollow rectangular body having side walls 23 and end walls 24, the walls being preferably of sheet metal and the upper edges of the walls being overturned as at 25 so as to be reinforced, it being preferable that reinforcing wire or rod material 26 be located in the bead formed by overturning these edges of the walls. The length and breadth dimensions of the body comprising the receiver are substantially the same as the corresponding dimensions of the generator body, and the lower portions of the side and end walls of the receiver body are turned outwardly, as at 27, and thence downwardly, as at 28, and formed with a bead 29. These offset portions of the walls of the receiver body fit about and rest upon the upper portions of the walls of the generator body, as clearly shown in the said Figures 1 and 2, it being understood that the receiver body may be withdrawn from the generator body when occasion requires. Within the receiver body there is arranged a receiving pan indicated in general by the numeral 30 and this pan is preferably formed from a sheet of metal so pressed into shape that the pan will be inclined downwardly from the sides and ends toward the center. In order that steam delivered from the generator may pass the receiver and reach the condenser and there be condensed, a plurality of short spouts 31 are arranged in upstanding position upon the pan 30 and communicate at their lower ends with openings 32 formed in the said pan, the steam being delivered from the generator through the openings and spouts into the space above the receiving pan. A pipe 33 leads from the lowest or central portion of the pan laterally and through one side wall of the receiver 2 and preferably has its discharge end turned downwardly at an angle, as indicated by the numeral 34, so that the pipe will be adapted to discharge either directly into a vessel placed below the said end, or a hose may be connected to this end of the pipe and may lead to any suitable receiving vessel.

As heretofore stated, means is provided for aerating the vapors at the time of condensation, and this means comprises pipes 35 which are extended across the interior of the generator body 1 and have their ends opening through the side walls of the said body so that air may enter the pipes from both ends. Branch pipes 36 lead upwardly from the intermediate portions of the pipes 35 and through the bottom 13 of the generating chamber 14, the pipes being welded or otherwise united in a water-tight manner to the said generator bottom, as shown in Figure 1. The pipes continue upwardly and fit loosely through openings 37 formed in the plate 16, and further continue upwardly and through openings 38 formed in the pan 30, sleeves 39 being secured upon the upper side of the pan and surrounding the said openings 38 and the portions of the pipes which extend therethrough and constituting means for preventing the escape of distilled water through the said openings 38. The branch pipes 36 terminate at their upper ends a suitable distance above the pan 30 and discharge at their said ends into the space above the pan. At this point it will be evident that in this manner air is supplied to the vapors delivered into the space above the receiving pan and mixes with the vapors at the time they are condensed so that the distilled water which is delivered from the receiving pan through the pipe 33 will contain approximately the same volume of absorbed air as water obtained from natural sources.

The condenser 3 comprises a casing having side walls 40 and end walls 41, the casing being of rectangular form and having the lower portion of its said walls extended outwardly, as at 42, and thence downwardly, as at 43, so as to adapt the lower end of the casing to be removably fitted onto the upper end of the body of the receiver 2. The casing of the condenser is open at its top and bottom and arranged within the casing in alternate order are cooling-water chambers 44 and condensation chambers 45. These chambers are of general rectangular form and are relatively narrow and extend transversely in vertical planes between the opposite side walls 40 of the casing of the condenser and terminate a distance spaced from the said side walls equal substantially to the width of any one of the chambers so that additional water chambers 46 are provided at the end of the chambers 44 and 45. The water chambers 44 and 46 are provided with bottoms indicated respectively by the numerals 47 and 48 and these chambers are open at their top. On the other hand, the chambers 45 are open at their bottoms and closed at their tops as indicated by the numeral 48. It will be observed that relatively adjacent ones of the water and condensation chambers 44 and 45 have walls in common and that the arrangement of the chambers is such that a water chamber will be located next adjacent to each end wall 41 of the casing of the condenser, the said walls 41 in fact forming each a wall of the respective water chamber. Therefore, the endmost ones of the water chambers 44 and the water chambers 46, form practically a continuous water chamber surrounding the series of alternated chambers 44 and 45, each condensation chamber being therefore surrounded on all sides except its bottom, by the cooling water. The open tops of the water chambers 44 and the closed tops 49 of the condensation chambers 45 are located in a common plane spaced somewhat below the plane of the open top of the casing of the condenser, and likewise the open bottoms of the condensation chambers and the closed bottoms 47 of the water chambers are suitably spaced above the plane of the bottom of the said casing of the condenser. In order that there may be circulation of air within the condensation chambers without any appreciable loss of the steam however, the closed top 49 of each condensation chamber 45 is formed with a small vent opening 50, and the material of the said closed top, surrounding the opening is turned downwardly, as indicated by the numeral 51, so as to provide a short nipple. The purpose of providing for circulation of air in the manner outlined is to secure a thorough aeration of the steam vapors and to convey from the still any noxious vapors present in the steam in the event the water from which the steam is generated contains any minerals or impurities such, for example, as sulphur, magnesia, etc. A tube 52 is secured upon the closed top of each condensation chamber concentric to the vent opening 50 and extends upwardly within the space above the series of chambers 44 and 45 nearly to the plane of the open top of the casing of the condenser, the tubes being open at their upper ends.

In order that water may be supplied to the water chambers of the condenser, a water supply pipe 53 is led through one end wall 41 of the casing of the condenser at a point below the plane of the closed bottoms of the water chambers 44, and this pipe has branches, within the said casing, indicated by the numeral 54 to which branches are connected water pipes 55 which extend parallel to the side walls 40 of the casing of the condenser and substantially to the opposite end walls 41 thereof where they are connected by short branches 56 with a branch pipe 57 which leads through the said end wall of the casing and is connected to one side of the casing of a cut-off valve 58, the other side of the casing of the valve being connected to a pipe 59 which will presently be referred to more specifically. Short tubes 60 extend upwardly from the pipes 55 and communicate with the water chambers 44 through the closed bottoms thereof, as clearly shown in Figures 1 and 2 of the drawings. The pipe 59 extends downwardly from the valve 58 with its lower end located above or preferably substantially within the open top of the funnel 20, and the pipe likewise extends vertically above the valve 58 and is connected by an elbow 61 with a short branch 62 which is placed in communication with the interior of the condenser casing through the end wall thereof, a cut off valve 63 being interposed in the said pipe 59. An overflow pipe 64 is mounted through the other end of the condenser casing and is provided interiorly of the casing with a downwardly extending branch 65 to obviate air being drawn through the pipe during the outflow of water therethrough and which would result in the overflow being attended by a gurgling sound. A cut-off valve 66 is mounted in the pipe 64 exteriorly of the condenser casing. Branch pipes 66' likewise lead from the pipes 55 and communicate with the water chambers 46 through the closed bottoms thereof.

From the foregoing description of the invention it will be understood that water is admitted to the condenser through the pipe 53 and the pipes 55 and their tubular branches 60, the valve 58 being closed. The water will rise in the water chambers 44 and 46 until it reaches the level of the overflow pipe 64. If desired the valve 66 may be opened to permit of overflow, or this valve may be closed. In any event when the apparatus is being employed as a still, water is supplied to the generator by opening the valve 63 to such an extent as to permit of flow of water from the pool above the water and condensation chambers 44 and 45 of the condenser to the funnel 20 and from the funnel through the pipe 19 into the preheating chamber 9 where it will be initially heated and, the flow of water being properly regulated, will be discharged from this chamber through the openings 15 and onto the bottom of the generating chamber 14 where, owing to the small volume of water distributed over the relatively large area of the said bottom of the generating chamber, the water will be rapidly converted into steam which, escaping through the openings 18, will rise and pass through the tubular spouts 31 of the receiving pan 30. Rising above the pan, the steam will enter the condensation chambers 45 and, coming in contact with the water cooled walls of these chambers, will be condensed and the condensate will be delivered to the receiving pan 30 and, flowing down the inclined sides of this pan, will leave the apparatus by way of the pipe 33. By providing the vent openings 50 in the top of the condensation chambers 45, a more thorough circulation of air and steam in these chambers is effected, and there is no appreciable loss of the steam for the reason that if any should escape through the vent openings 50, it would be condensed in the tubes 52 inasmuch as these tubes are surrounded by the cooling water, and would be returned to the chambers 45 through the said vent openings, the overturning of the material of the closed tops 49 of the condensation chambers about the openings 50, as at 51, serving to collect the water and insure of its discharge through the openings and into the said chambers 45.

In the event that it should for any reason become necessary to empty the condenser of water previously delivered thereto, this may be readily accomplished by opening the valve 58. The best results will, of course, be obtained where a constant circulation of water through the condenser is established but where running water is not available, the valve 53' which is interposed in the pipe 53 may be closed, as well as the valves 66 and 63, the valve 58 being opened sufficiently to maintain a proper supply of water to the generator, water being then poured into the condenser.

Figure 7:
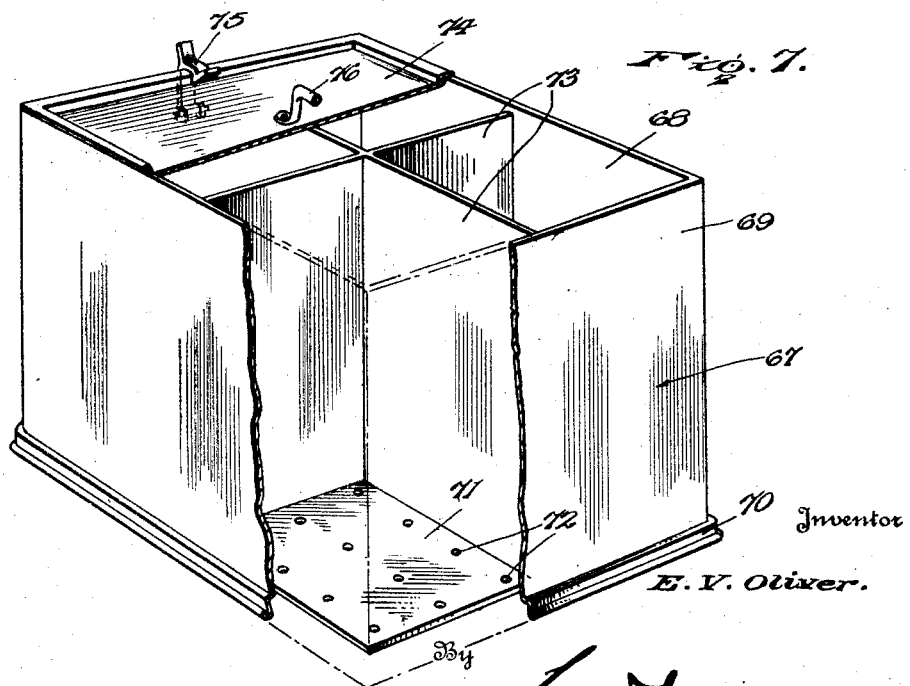
Figure 7 is a sectional perspective view of the steam cooking attachment of the apparatus.

As the apparatus is intended for domestic use, it will preferably embody a steam cooker such as illustrated in Figure 7 of the drawings and indicated in general by the numeral 67. The cooker attachment comprises side walls 68 and end walls 69 and is provided with an off-set rim 70 at its bottom adapting it to be fitted onto the top of the receiver 2 after removal of the condenser 3 therefrom. The body of the cooker is provided with a bottom 71 which is formed with perforations 72, and intersecting partitions 73 are arranged within the interior of the cooker body and serve to divide the interior into a number of separate and independent compartments in which may be placed the commodities to be cooked. The body of the cooker is provided with a lid 74 adapted to be held in place by clamps 75 and provided with a handle 76 which may be grasped for the purpose of removing it.

Having thus described the invention, what is claimed as new is:

1. In distilling apparatus, a generator comprising a hollow body, a preheating chamber extending about the interior of the body and including walls spaced from the walls of the body, means for supplying fluid to be distilled to the preheating chamber, a plate supported by and within the boundaries of the said walls of the preheating chamber and constituting, in connection with the upper portions of said walls, a generating chamber, the said upper portions of the walls above and relatively close to the said plate being formed with openings to provide for supply of the fluid from the preheating chamber to the generating chamber in a relatively shallow pool extending over the surface of the said plate.

2. In distilling apparatus, a generator comprising a generating chamber and a preheating chamber both open at their top, the wall of the generating chamber having an opening establishing communication between it and the preheating chamber, means for supplying the fluid to be distilled to the preheating chamber, and a heat confining plate extending over the top of the generating and preheating chambers and having perforations in the portions of its area which extend over both of said chambers.

3. In distilling apparatus, a generator comprising a generating chamber and a preheating chamber both open at their top, the wall of the generating chamber having an opening establishing communication between it and the preheating chamber, means for supplying the fluid to be distilled to the preheating chamber, a heat confining plate extending over the top of the generating and preheating chambers and having perforations in the portions of its area which extend over both of said chambers, a condenser and means for conducting the vapors from the generating chamber to the condenser.

4. In distilling apparatus, a condenser comprising alternately arranged condensation and cooling-fluid chambers, the condensation chambers being open at their bottoms and having vent openings in their closed tops, tubes leading upwardly from the closed tops of the said condensation chambers and communicating at their lower ends with the said vent openings, a casing enclosing the said condensation and cooling-fluid chambers whereby a body of cooling fluid may be established about the said tubes, a cooling-fluid supply pipe, branches leading therefrom to the closed bottoms of the cooling-fluid chambers, means for supplying the vapors to be condensed to the space below the open bottoms of the condensation chambers, and means for collecting the condensate from the condensation chambers.

5. In distilling apparatus, a condenser comprising a casing, alternately arranged condensation and cooling-fluid chambers arranged within the casing, the condensation chambers being closed at their tops and open at their bottoms and the cooling-fluid chambers being open at their tops and closed at their bottoms, the said chambers terminating at their ends short of the relatively adjacent walls of the casing, a cooling-fluid chamber between the said ends of the first mentioned chambers and the said walls of the casing, means for delivering a cooling fluid to all of the cooling-fluid chambers individually, and means for collecting the condensate from the condensation chambers.

6. In distilling apparatus, a condenser comprising alternately arranged condensation and cooling-fluid chambers, the former being open at their bottoms and the latter open at their tops, means for supplying the vapors to be condensed to the space below the open bottoms of the condensation chambers, a cooling fluid supply pipe extending through one wall of the condenser, branches extending from the pipe in opposite directions, pipes extending from the branches in parallel relation beneath the series of condensation and cooling-fluid chambers, tubular branches leading from the said last-mentioned pipes to the bottoms of the cooling-fluid chambers, an outlet pipe leading through the opposite wall of the condenser, branches connecting the other ends of the said parallel pipes to the said outlet pipe, a valve in the inlet pipe, a valve in the outlet pipe, an overflow pipe leading from the condenser above the series of condensation and cooling-fluid chambers, and connection between the last-mentioned valve and the said overflow pipe.

7. In distilling apparatus, a condenser comprising alternately arranged condensation and cooling-fluid chambers, the former being open at their bottoms and the latter open at their tops, means for supplying the vapors to be condensed to the space below the open bottoms of the condensation chambers, a cooling fluid supply pipe extending through one wall of the condenser, branches extending from the pipe in opposite directions, pipes extending from the branches in parallel relation beneath the series of condensation and cooling-fluid chambers, tubular branches leading from the said last-mentioned pipes to the bottoms of the cooling-fluid chambers, an outlet pipe leading through the opposite wall of the condenser, branches connecting the other ends of the said parallel pipes to the said outlet pipe, a valve in the inlet pipe, a valve in the outlet pipe, an overflow pipe leading from the condenser above the series of condensation and cooling-fluid chambers, connection between the last-mentioned valve and the said overflow pipe, and a cut-off valve in the overflow pipe near the upper end thereof.

8. In distilling apparatus, a condenser comprising alternately arranged condensation and cooling-fluid chambers, the former being open at their bottoms and the latter open at their tops, means for supplying the vapors to be condensed to the space below the open bottoms of the condensation chambers, a cooling fluid supply pipe extending through one wall of the condenser, branches extending from the pipe in opposite directions, pipes extending from the branches in parallel relation beneath the series of condensation and cooling-fluid chambers, tubular branches leading from the said last-mentioned pipes to the bottoms of the cooling-fluid chambers, an outlet pipe leading through the opposite wall of the condenser, branches connecting the other ends of the said parallel pipes to the said outlet pipe, a valve in the inlet pipe, a valve in the outlet pipe, an overflow pipe leading from the condenser above the series of condensation and cooling-fluid chambers, connection between the last-mentioned valve and the said overflow pipe, a cut-off valve in the overflow pipe near the upper end thereof, and a valved overflow leading from the opposite side of the condenser at a point above the said condensation and cooling-fluid chambers.

9. In distilling apparatus, a generator comprising a hollow body, a preheating chamber extending about the interior of the body and including walls spaced from the walls of the body, a plate supported by and within the boundaries of the said walls of the preheating chamber and constituting, in connection with the upper portions of said walls, a generating chamber, said upper portions of the walls above and close to the said plate being formed with openings to provide for supply of fluid from the preheating chamber to the generating chamber in a shallow pool extending over the surface of said plate, a condenser arranged above the generating chamber, means for supplying a cooling fluid to the condenser, and means for delivering the overflow of fluid from the condenser to the preheating chamber of the generator.

10. In distilling apparatus, a generator, a condenser located above the generator, a receiver located below the condenser, means for the passage of vapor from the generator to the receiver, through the condenser, the condenser comprising condensation and fluid-cooling chambers, the condensation chambers being open at their bottoms and closed at their tops, the closed top of each condensation chamber being provided with a vent opening, a vent tube upstanding from the top of each condensation chamber and in communication at its lower end with a respective one of the vent openings, means for admitting a cooling fluid to the condenser, and means for permitting an overflow of the cooling fluid from the condenser to maintain the water level within the condenser below the upper ends of the said tubes.

11. In distilling apparatus, a generator, a condenser located above the generator, a receiver located below the condenser, means for the passage of vapor from the generator through the receiver to the condenser, the condenser comprising condensation and fluid-cooling chambers, the condensation chambers being open at their bottoms and closed at their tops, the closed top of each condensation chamber being provided with a vent opening having its wall formed to provide a downwardly projecting nipple, and a vent tube mounted upon the said closed top of each condensation chamber concentric to a respective one of the said openings and of an interior diameter greater than the diameter of the openings.

In testimony whereof I affix my signature.

ERNON V. OLIVER. [L. S.]